United States Patent

Heile et al.

[11] Patent Number: 5,901,560
[45] Date of Patent: May 11, 1999

[54] PROCESS FOR OPERATING A MOTOR VEHICLE AIR CONDITIONER HAVING A PROTECTIVE COMPRESSOR SWITCH-OFF FUNCTION

[75] Inventors: Dieter Heile, Pluederhausen; Wolfgang Volz, Magstadt, both of Germany

[73] Assignee: Daimler-Benz Aktiengesellschaft, Stuttgart, Germany

[21] Appl. No.: 09/066,977

[22] Filed: Apr. 28, 1998

[30] Foreign Application Priority Data

Apr. 28, 1997 [DE] Germany ............ 197 17 998

[51] Int. Cl.⁶ ............ F25B 1/00
[52] U.S. Cl. ............ 62/115; 62/228.3; 62/209
[58] Field of Search ............ 62/115, 129, 209, 62/228.3, 228.1, 228.4, 190

[56] References Cited

U.S. PATENT DOCUMENTS 5,301,514  4/1994  Bessler ............ 62/129
5,586,445  12/1996  Bessler ............ 62/209

FOREIGN PATENT DOCUMENTS 195 12 356  3/1996  Germany.

*Primary Examiner*—John M. Sollecito
*Attorney, Agent, or Firm*—Evenson, McKeown, Edwards & Lenahan, P.L.L.C.

[57] ABSTRACT

A process for operating a motor vehicle air conditioner, which contains a refrigerant circulating system with a compressor and an evaporator. The compressor is deactivated to protect against an insufficient amount of refrigerant being supplied to the compressor when the refrigerant pressure on the high-pressure side of the refrigerant circulating system falls below a definable value. The deactivation to protect against inadequate refrigerant levels is suppressed as long as the temperature of the motor vehicle engine coolant (which is utilized to heat an air flow blown by the air conditioner into the vehicle interior), is below a definable coolant temperature deactivation threshold value and the evaporator temperature is above a definable first evaporator temperature deactivation threshold value. The process can also be used to reduce the tendency of the vehicle's windows to fog up.

6 Claims, 2 Drawing Sheets

PROCESS FOR OPERATING A MOTOR VEHICLE AIR CONDITIONER HAVING A PROTECTIVE COMPRESSOR SWITCH-OFF FUNCTION

BACKGROUND AND SUMMARY OF THE INVENTION

This application claims the priority of German patent document 197 17 998.3, filed Apr. 28, 1997, the disclosure of which is expressly incorporated by reference herein.

The present invention relates to a process for the operation of a motor vehicle air conditioner which contains a refrigerant circulating system having a compressor and an evaporator. In this process, the compressor is deactivated to protect against being inadequately filled with refrigerant, due to the refrigerant pressure on the high-pressure side of the refrigerant circulating system falling below a definable limit.

In a process of this type (which is used in motor vehicles produced by the applicant), the protective deactivation of the compressor is accomplished by automatically deactivating the compressor when the refrigerant pressure falls below a definable deactivation threshold value of, for example, 1.75 bar. Here, the reactivation of the compressor is only permitted when the refrigerant pressure exceeds an activation threshold value of, for example, 2.25 bar (which is higher than the 1.75 bar value)

In parallel thereto, the compressor is protected from icing-up by automatically deactivating the compressor when the evaporator temperature falls below a definable deactivation threshold value of, for example, 1° C. Here, as before, the compressor can only be reactivated when the evaporator temperature exceeds a turn on threshold value of, for example, 3° C. (which is higher than the 1° C. value). Together, the two protective deactivation functions prevent damage to the air conditioner (particularly the compressor) when quantity of refrigerant in the refrigerant circulating system is too low or the evaporator becomes iced up.

A common control method for the compressor is the so-called reheat operation. This method entails cooling the air flow blown into the vehicle by the evaporator and subsequently heating the blown air with the heater of the air conditioner. This method is particularly expedient at low outside temperatures and in humid weather when seeking to prevent the vehicle's windows from fogging-up. The windows of the vehicle have an increased tendency to fog up when the air conditioner is restarted after parking for a short time. This is because, once the air conditioner is switched off (that is, when the vehicle is parked), the evaporator normally housed in an air-conditioning compartment will be moist on its surface. Furthermore, the air situated in the air-conditioning compartment will be heated up by the warmer surroundings of the air-conditioning compartment (e.g., the engine compartment) and therefore absorbs water vapor from the evaporator surface. If the air conditioner is then restarted shortly thereafter, this moistened air will enter the vehicle interior, whereby under corresponding conditions, the water vapor absorbed by the air conditioner condenses on the windows.

German Patent Document DE 195 12 356 Cl and the literature cited therein, discloses a process for motor vehicle air conditioners (within the scope of reheating operations) that seeks to remedy this tendency of a vehicle's windows to fog up by, for example, delaying a fan activation with respect to the activation of the compressor when the air conditioner is restarted. In this process of deactivating the compressor to protect against the vehicle's windows icing-up, deactivation of the compressor will (as a rule), however, no longer be activated at outside temperatures below approximately 0° C. As a result, it is no longer possible to counteract the tendency of the windows to fog-up.

An additional disadvantage of this process is that when the protective compressor is deactivated, due to being inadequately filled with refrigerant, activation of the compressor does not take place in additional special operating conditions (even though the windows have a tendency to fog up). The reason for this is, since the refrigerant pressure also depends on the temperature conditions, a refrigerant pressure which is equal to or slightly higher than the pertaining deactivation or activation value (in the event of a lower outside temperature of, for example, approximately −2° C.), still corresponds to a normal refrigerant quantity. On the other hand, at higher outside temperatures of, for example, 0° C. of an insufficient refrigerant quantity, the pertaining deactivation or activation value corresponds to the compressor being inadequately filled with refrigerant. Therefore, when the vehicle is parked at an outside temperature that is slightly above 0° C. (during which time the air conditioner with an activated compressor operating to the cool the vehicle interior), in the event of a subsequent new start, the compressor is not switched on if the outside temperature has fallen in the interim, even if the windows have begun to fog up. This phenomenon is due to the compressor being deactivated to protect against the effects of inadequately filling the compressor with refrigerant.

The object of the present invention is to provide a process whereby, despite implementation of the protective shut-off function when the compressor is inadequately filled with refrigerant, the tendency of the windows to fog up can be counteracted in a comparatively reliable manner.

This and other objects and advantages of the invention are achieved by the process according to the invention, in which the compressor is deactivated to protect against the compressor being inadequately filled with refrigerant, due to the refrigerant pressure ($p_k$) on the high-pressure side of the refrigerant circulating system falling below a definable refrigerant pressure switch-off threshold value ($p_{k1}$).

In this process according to the present invention, the protective deactivation (when the compressor is inadequately filled with refrigerant) is suppressed in the special case where the engine coolant temperature is below a definable coolant deactivation threshold value and the evaporator temperature is above a definable first evaporator temperature deactivation threshold value. As a result of this measure, compressor activation is ensured when the vehicle is parked at a higher outside temperature of, for example, slightly above 0° C., and where the compressor was operating during a drop in the outside temperature (prior to the interim that the vehicle is restarted). In this scenario, the protective deactivation function (when the compressor is inadequately filled with refrigerant) is suppressed as long as, on the one hand, the evaporator temperature is still above the first evaporator deactivation threshold value (which may be set, for example, at approximately 2° C.) and, on the other hand, the engine coolant temperature has not yet reached its defined deactivation threshold value. The automatic deactivation of the compressor for preventing the tendency of the windows to fog up (which can be triggered after any of the conventional approaches) is therefore undisturbed in this operating situation due to the protective deactivation of the compressor when it is inadequately filled with refrigerant.

In contrast, if the evaporator temperature falls under the first evaporator temperature deactivation threshold value, the deactivation of the compressor can be triggered so that damage due to ice on the evaporator is prevented. A compressor deactivation can also (for example) take place because the protective deactivation when the compressor is inadequately filled with refrigerant is permitted. This is because the engine coolant temperature has reached or exceeded its deactivation threshold value. Since the engine coolant is utilized for heating the air flow which can be blown into the vehicle interior, the engine coolant (which was brought to its threshold value temperature) can sufficiently heat the air current such that warm air is blown against the vehicle's windows. Therefore, without any air drying, due to reheating the air, the windows will no longer fog up.

In another embodiment of the present invention, the function to protect deactivation against icing-up (where the compressor is automatically deactivated or activated) does not take place if the evaporator temperature is under a definable second evaporator temperature deactivation threshold value (which is higher than the first evaporator temperature deactivation threshold value) and is set, for example, to approximately 1° C.

Other objects, advantages and novel features of the present invention will become apparent from the following detailed description of the invention when considered in conjunction with the accompanying drawings.

DETAILED DESCRIPTION OF THE DRAWING

Figure 1:
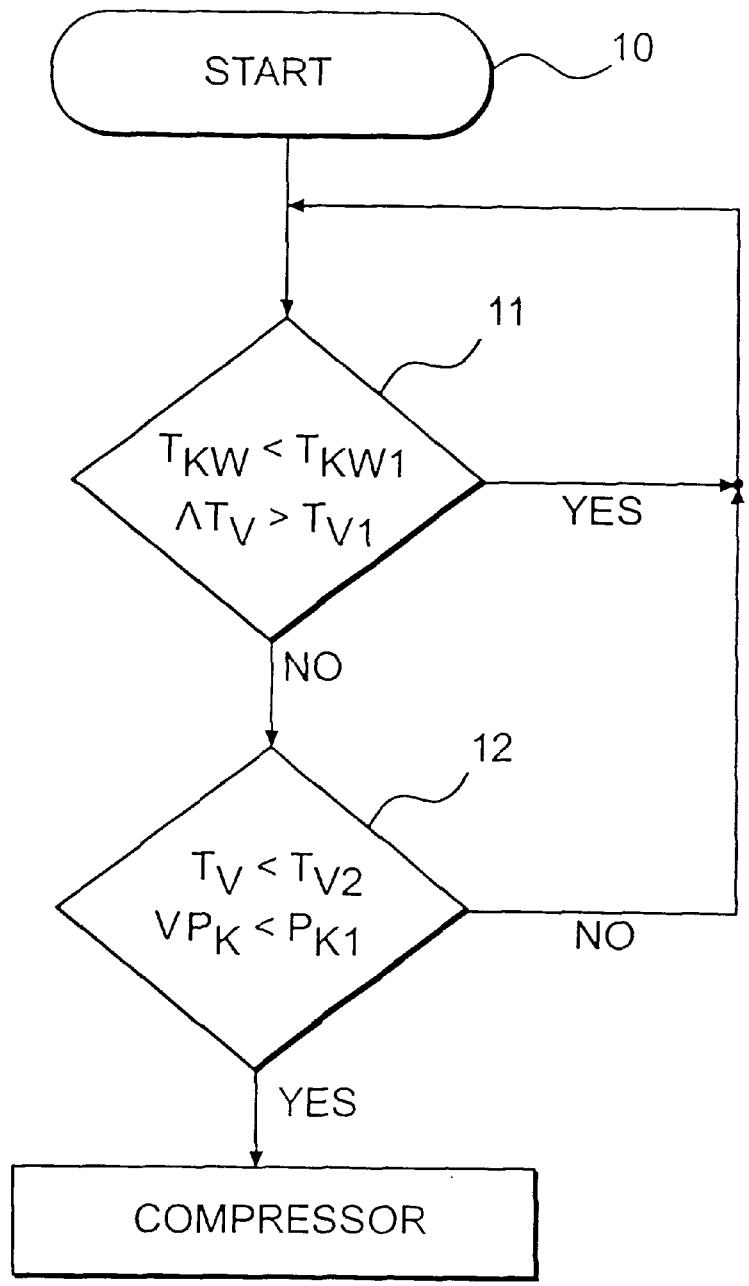
FIG. 1 shows a flow chart of that part of a process for operating a motor vehicle air conditioner which relates to automatic compressor deactivation operations.
Figure 2:
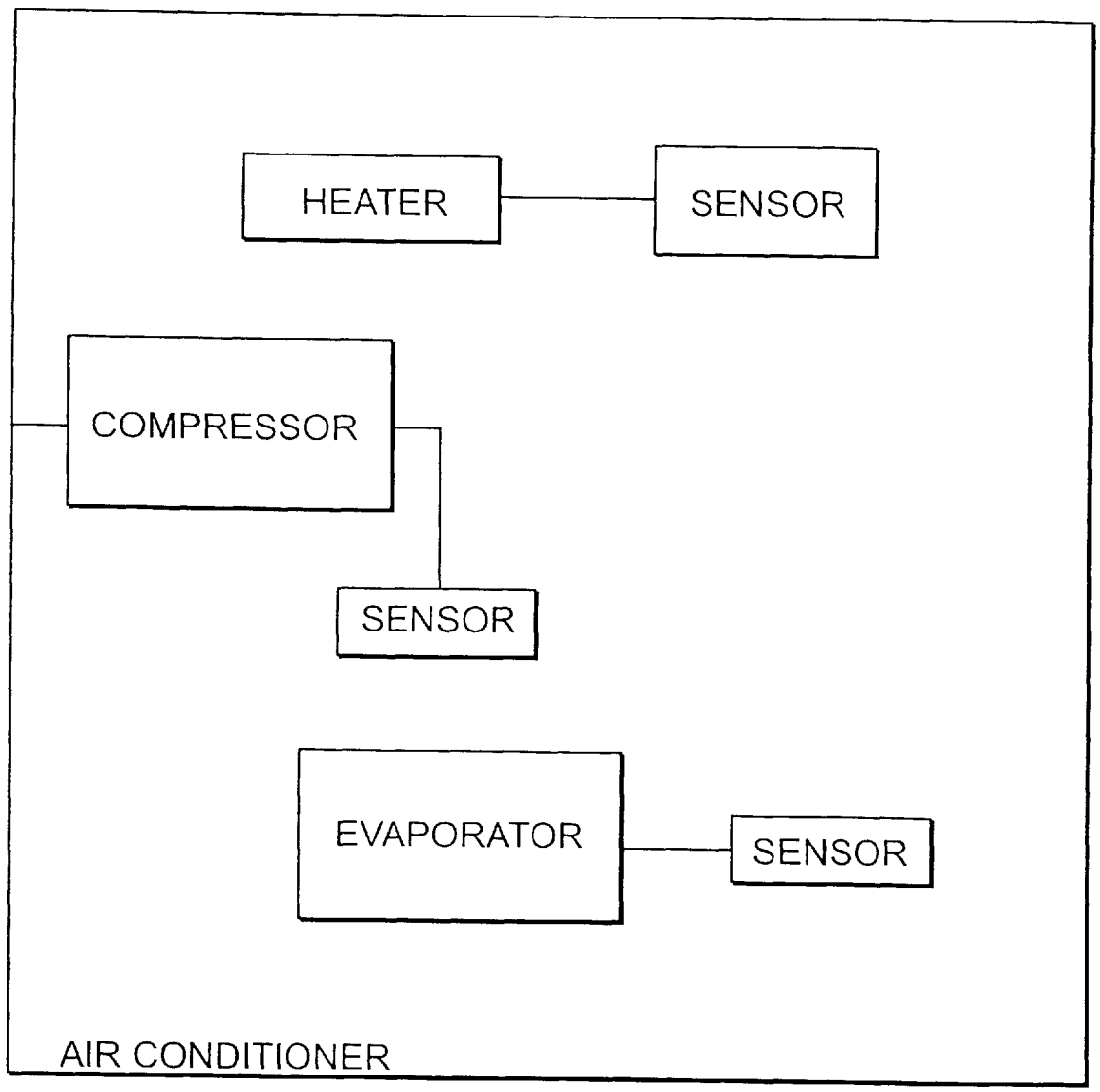
FIG. 2 shows a block diagram of a motor vehicle air conditioner for implementation of process according to the invention.

The flow chart (illustrated in the FIG. 1) shows the part of a process which is essential to the invention for operating a motor vehicle air conditioner that is constructed in a conventional manner. The vehicle air conditioner (as shown in FIG. 2), inter alia, contains a refrigerant circulating system having a compressor and an evaporator. The compressor takes in the refrigerant on the low-pressure side of the refrigerant circulating system and compresses it. The refrigerant pressure on the adjoining high-pressure side is sensed by a conventional refrigerant high-pressure sensor. In addition, an evaporator temperature sensor is provided which measures the temperature of the evaporator. Additionally, the air conditioner contains a conventional heater with which the air flow blown into the vehicle interior (as required) can be heated during the reheating of the air and during initial heating of the air by the air conditioner. The necessary heat is supplied by the coolant of the engine (which flows through the heater that is designed as a heat exchange element). The temperature of the engine coolant is measured by a corresponding sensor.

The operating process of the air conditioner which is performed by a correspondingly designed control unit (in addition to the conventional air conditioner functions) contains the automatic activation of the air conditioner function during air reheating operations in situations where there is the danger of the vehicle's windows fogging up. This function is particularly suited to cases where there is a new activation of the air reheating operation or during pure air cooling by the air conditioner after the air conditioner has stopped for a relative short period of time. Additionally, the deactivation to protect against icing-up and inadequate fillings of the compressor (at an, insufficient evaporator temperature or at an insufficient refrigerant pressure on the high-pressure side) are integrated in the manner illustrated by the flow chart such that they do not impair the measures designed to counteract the tendency of the windows to fog up.

For this purpose, the following compressor deactivation logic illustrated in the figure is implemented in the air conditioner control unit. After a starting step 10 at a point in time of an activation requirement for the compressor, a continuous query in step 11 is performed to determine whether, on the one hand, the evaporator temperature $T_V$ is above a definable first evaporator temperature switch-off threshold value $T_{V_1}$, and whether, on the other hand, the engine coolant temperature $T_{KW}$ is lower than a definable coolant temperature deactivation threshold value $T_{KW1}$. As long as these two conditions are met, the protective deactivation function for the compressor will not become active (that is, when a compressor activation command is present, it is complied with and, in the event that the compressor has already been activated in the interim, a forced deactivation of the compressor will not take place). The first evaporator temperature deactivation threshold value $T_{V_1}$, can be set, for example, to −2° C. or (according to the particular application) to another low temperature value.

The coolant temperature deactivation threshold value $T_{KW1}$ can be set to 60° C. or (according to the particular requirements) to another temperature value of similar magnitude. The two deactivation threshold values $T_{V_1}$ and $T_{KW1}$ are determined according to the particular criterion for preventing icing-up of the evaporator. In the alternative, the deactivation threshold values $T_{V_1}$ and $T_{KW1}$ are set such that the icing-up takes place (to a lesser extent), during the relatively short time period that the engine coolant requires (at the time of a restart of the vehicle, after a previous deactivation of the engine) to exceed its deactivation threshold value. In this case, the coolant temperature deactivation threshold value $T_{KW1}$ is selected such that, when its temperature $T_{KW}$ has reached this threshold value $T_{KW1}$, the engine coolant will be capable of heating the air flow blown into the vehicle interior by the air conditioner to an extent sufficient enough to ensure that the vehicle's windows (which are subjected to this warm blown air flow) will no longer fog up (because there is no longer a drop of the temperature below the dew point).

This measure (in particular) therefore ensures that deactivation or reactivation of the compressor is suppressed when the inadequate filling deactivation criterion is present. Furthermore, short-term compressor operation si permitted without damage due to the icing-up of the evaporator and lastly, permits the determination of situations in which the vehicle's windows can possibly fog and thus be prevented from doing so by sufficiently heating the air flow blown into the interior of the vehicle.

If at least one of these two conditions no longer exists (i.e., the evaporator temperature $T_V$ reaches the first evaporator temperature threshold value $T_{V_1}$, or falls under it, or the coolant temperature $T_{KW}$ reaches its deactivation threshold value $T_{KW1}$, or rises above it), the evaporator temperature $T_V$ is checked in a next query step 12 to determine whether it has fallen below a second evaporator temperature deactivation threshold value $T_{V2}$, or to determine whether the high-pressure-side refrigerant pressure $p_k$ is smaller than a definable refrigerant pressure deactivation threshold value $p_{k1}$. These two conditions implement the conventional protective deactivation criteria and thus protect against icing-up and inadequate refrigerant levels for the compressor.

The second evaporator temperature deactivation threshold value $T_{V2}$ is selected such that it is larger than the first and is set, for example, at 1° C. (or a temperature value similar in magnitude). To ensure against premature reactivations (while the compressor is deactivated), a conventional hysteresis is provided, i.e., reactivation while the compressor is switched off will not be possible before the evaporator-temperature $T_V$ has exceeded an evaporator temperature reactivation threshold value of, for example, 3° C. (which is higher than the second evaporator temperature switch-off threshold value $T_{V2}$).

Analogously, the refrigerant pressure deactivation threshold value $p_{k1}$ may be set to a value of, for example, 1.75 bar (or another value suitable for the indicated application). Here, reactivation of the compressor will not be possible before the refrigerant pressure $p_k$ has exceeded a refrigerant pressure activation threshold value of, for example, 2.25 bar (which is higher than the 1.75 bar value).

If none of the two protective deactivation criteria queried in step 12 have been met (while the compressor is activated), there will be no forced deactivation of the compressor. Furthermore, a compressor activating command which occurs while the compressor is switched off (when the above-mentioned activation hysteresis conditions are met), leads to a new activation of the compressor.

In contrast, if the evaporator temperature $T_V$ falls below the second evaporator temperature deactivation threshold value $T_{V2}$ (while the compressor is running), a forced deactivation of the compressor takes place as a protective measure against an ice-up of the evaporator and the possible resultant damage (Step 13). In the same manner, a forced deactivation of the connected compressor takes place as a protection against inadequate levels of refrigerant in the refrigerant circulation system (if the respective criterion has been met), i.e., the high-pressure side refrigerant pressure $p_k$ falls under its given deactivation threshold value $p_{k1}$. In contrast to the conventional, unconditional forced deactivation of the compressor, the present measures are conditional protective deactivation measures which, according to the invention, are linked to the presence of the conditions queried in the initial query step 11.

As a result, via the particular process the compressor is no longer activated when the vehicle is parked at an outside temperature of slightly above 0° C., when the air conditioner and particularly the compressor were in operation; and when (during a subsequent restart of the vehicle) the outside temperature has fallen in the interim and therefore which, on the one hand, causes a tendency of the windows to fog up and, on the other hand, causes the high-pressure-side refrigerant pressure $p_k$ to fall below the refrigerant pressure activation value. Reactivation of the forcibly deactivated compressor will be permitted again no later than when the evaporator temperature $T_V$ has reached or exceeded the evaporator temperature activation threshold value and the high-pressure-side refrigerant pressure $p_k$ has reached or exceeded the refrigerant pressure activation threshold value.

The example of the process explained above is suitable for air conditioners having a compressor with a coupling, as well as for those with an externally continuous output regulated, possibly no-coupling compressor. The compressor with the coupling can be set to 0% output by the deactivation of a magnetic coupling that is typically used and can thus be switched off. In the case of the externally continuously output-controlled compressor, the compressor output is returned via an internal control element, such as a suction pressure control valve.

While still fulfilling the described required functions, it is understood that the specific pressure and temperature values indicated for the described embodiment of the process (particularly for the various threshold values), can be varied according to the particular vehicle and the environment of the respective invention.

The foregoing disclosure has been set forth merely to illustrate the invention and is not intended to be limiting. Since modifications of the disclosed embodiments incorporating the spirit and substance of the invention may occur to persons skilled in the art, the invention should-be construed to include everything within the scope of the appended claims and equivalents thereof.

We claim:

1. A process for operating a motor vehicle air conditioner, which contains a compressor and an evaporator, comprising the steps of:

deactivating the compressor to protect against inadequate levels of coolant when a refrigerant pressure on a high-pressure side of a refrigerant circulating system falls below a definable refrigerant pressure deactivation threshold value; and suppressing the deactivation of the compressor as long as the temperature of the motor vehicle engine coolant is below a definable coolant temperature deactivation threshold value and the evaporator temperature is above a definable first evaporator temperature deactivation threshold value;

wherein the motor vehicle engine coolant is utilized for heating an air current which is blown from the air conditioner into the vehicle interior.

2. The process according to claim 1, wherein the compressor is deactivated to protect against ice when the evaporator temperature falls below a second evaporator temperature deactivation threshold value.

3. The process according to claim 2, wherein the second evaporator temperature deactivation threshold value is larger than the first evaporator temperature deactivation threshold value.

4. A process of operating a motor vehicle air conditioner, comprising the steps of:

monitoring a pressure of the air conditioner coolant of a refrigerant circulating system with a first sensor;

deactivating a compressor if the coolant pressure on a high pressure-side of the refrigerant circulating system is below a predetermined value;

monitoring a temperature of the air conditioner coolant and an evaporator with a second sensor and third sensor, respectively; and suppressing the deactivation of the compressor when the temperature of the coolant is below a predetermined temperature deactivation value and the evaporator temperature is above a predetermined first evaporator temperature deactivation threshold value.

5. The process according to claim 4, wherein the compressor is deactivated to protect against ice when the evaporator temperature falls below a second evaporator temperature deactivation threshold value.

6. The process according to claim 5, wherein the second evaporator temperature deactivation threshold value is larger than the first evaporator temperature deactivation threshold value.

* * * * *